United States Patent [19]
Shrader et al.

[11] Patent Number: 5,117,539
[45] Date of Patent: Jun. 2, 1992

[54] CLASP MECHANISM

[76] Inventors: James P. Shrader, 1264 Mundy Dr.;
Guy Beard, 2763 Southwood Ln.,
both of Jacksonville, Fla. 32207

[21] Appl. No.: 753,733
[22] Filed: Sep. 3, 1991
[51] Int. Cl.$^5$ ............................................. A44B 13/02
[52] U.S. Cl. .................................. 24/599.8; 24/598.5;
24/599.1
[58] Field of Search ............... 24/599.8, 598.7, 599.1,
24/599.2, 599.4, 599.7, 600.3, 601.9, 601.2;
63/12; 294/82.2

[56] References Cited

U.S. PATENT DOCUMENTS

| 628,619 | 7/1899 | Alwood | 24/599.1 |
|---|---|---|---|
| 731,162 | 6/1903 | Carter | 24/599.8 |
| 844,980 | 2/1907 | Welcome, Sr. | 24/599.1 |
| 1,790,056 | 1/1931 | Moody | 294/82.2 |
| 2,874,435 | 2/1959 | Nielsen | 24/599.1 |
| 3,956,804 | 5/1976 | Gatof et al. | 24/598.5 |

FOREIGN PATENT DOCUMENTS

| 0430892 | 10/1911 | France | 24/599.7 |
|---|---|---|---|
| 0231197 | 8/1925 | United Kingdom | 294/82.2 |
| 2106584 | 4/1983 | United Kingdom | 24/599.8 |

Primary Examiner—Victor N. Sakran
Attorney, Agent, or Firm—Thomas C. Saitta

[57] ABSTRACT

A clasp mechanism having a main body, a keeper arm and a spring, where the keeper arm extends through the main body in an arm cavity. The keeper arm is pivotally attached to said main body to operate in a scissor-like manner. The keeper arm has a mating end which abuts a hook end on the main body to form a closed interior space and an actuating shoulder extending from the main body. The spring maintains the mating end in the closed position abutting the hook end until the actuating shoulder is pressed into the main body by the user.

3 Claims, 1 Drawing Sheet

CLASP MECHANISM

BACKGROUND OF THE INVENTION

This invention relates generally to the field of clasp mechanisms used to join or close upon themselves chains, ropes or other articles. More particularly, the invention is directed to the field of such clasps used with jewelry chains, bracelets, necklaces, etc.

Clasps used in the jewelry field to join the ends of bracelets and necklaces are of necessity very small so that the clasp mechanism will not detract from the ornamentation of the piece. Such clasps must also be very secure since the jewelry can be very valuable. It is therefore desirable to have clasps which are designed and constructed to be effective against accidental opening, as well as to be easily workable by the user. It is also preferable that the clasp have some artistic merit to it as well. The mechanisms should also be of relatively simple construction.

Typical jewelry clasps operate with spring rings which require the user to slidingly move a curved pin contained within a tubular body to open and close the device. Because the clasp is of such small size, it is very difficult to operate this type of clasp. The user must balance and secure the main body portion while using a fingernail to slide back the mechanism. Other clasps, such as shown in U.S. Pat. No. 2,874,435 to Nielsen and U.S. Pat. No. 3,956,804 to Gatof et al., are constructed with closing pincers which must also be pried or pulled open. These clasps suffer from the same drawbacks.

It is an object of this invention to provide a clasp of small size which is relatively simple mechanically, secure and easily operable.

It is an additional object of the invention to provide a clasp which is operable by a simple squeezing motion between thumb and forefinger, eliminating the need to pull or pry on any particular parts of the device.

BRIEF SUMMARY OF THE INVENTION

The clasp comprises a main body portion, a keeper arm, and a spring member, where the keeper arm is pivotally attached to the main body portion at relatively central points longitudinally of each component so that the two components are moveable relative to each other in a scissor-like manner. The keeper arm is comprised of a mating end, an actuating shoulder, a spring cavity and pivot pin receiving means. The main body is comprised of a hook end, an arm cavity, an arm aperture, and a shoulder aperture. A linkage attachment means, comprising an aperture, loop or the like, is positioned at the end of the main body opposite from the hook end for permanent attachment of the object being joined.

The keeper arm is positioned within the arm cavity of the main body such that the mating end of the keeper arm extends through the arm aperture and meets or corresponds to the hook end. The actuating shoulder of the keeper arm extends from the shoulder aperture of the main body. A pivot pin or like means links the two elements, the pivot pin extending through arm cavity of the main body into the pivot pin receiving means of the keeper arm. The coiled spring in the spring cavity surrounds the pivot pin and the ends of the coiled spring abut portions of the spring cavity and arm cavity so as to maintain the device in the closed position until pressure is applied.

To operate the device, the user grasps the clasp so that the thumb and forefinger rest against the main body and the actuating shoulder part of the keeper arm. Squeezing the main body and the actuating shoulder causes compression of the spring and the actuating shoulder moves into the shoulder cavity of the main body. Because of the centralized pivot, this action causes the mating end of the keeper arm to move inwardly away from the hood end, creating an opening and allowing the hook end to be inserted onto a loop end of a chain, bracelet or necklace. Release of the pressure against the actuating shoulder allows the coiled spring to return the mating end of the keeper arm back into conjunction with the hook arm, closing off the opening and enclosing the loop end securely within the interior portion of the hook end. The pressure of the coiled spring maintains the clasp in this closed position until the device is opened by the user for removal of the loop end.

DETAILED DESCRIPTION OF THE INVENTION

With reference now to the figures, the invention will be described in view of the best mode and preferred embodiment. In general, the invention comprises a main body 10, a keeper arm 20, and a coiled spring 30.

Figure 1:
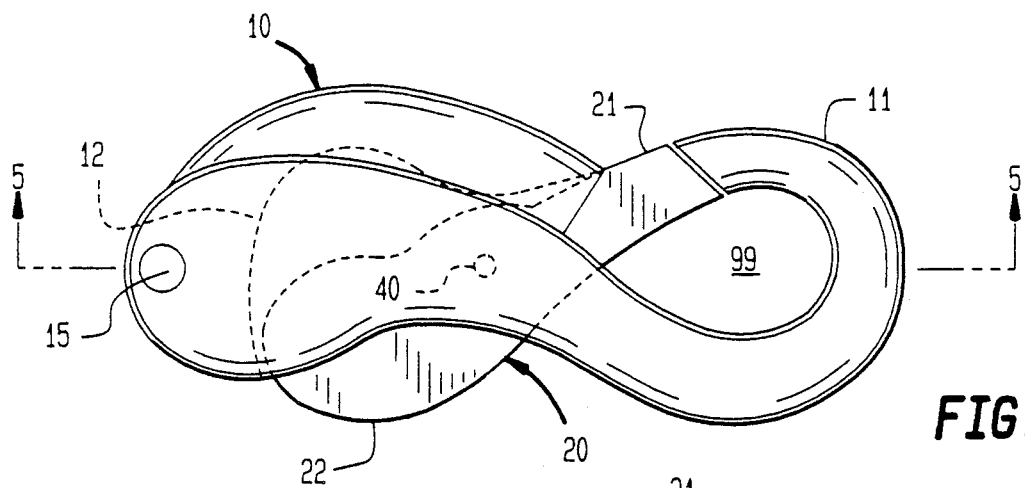
FIG. 1 a side view of the invention in the closed position.
Figure 2:
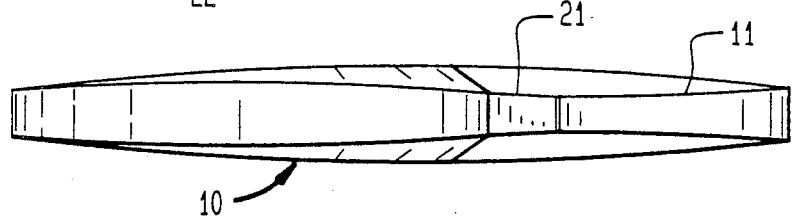
FIG. 2 is a top view of the invention.

Referring to FIG. 1, the relationship of the main body 10 and the keeper arm 20 is shown. The main body 10 comprises a hook end 11 and linkage attachment means 15 positioned at opposite ends of the main body 10. Linkage attachment means 15 is used for connecting the clasp to one end of the chain or article which requires joining, and can be an aperture (as shown) for receiving a chain link, a loop extending from the main body 10, or any other typical structure known in the art for accomplishing this attachment. This attachment will usually be a permanent attachment. Extending through the main body 10 is the keeper arm 20. Keeper arm 20 comprises a mating end 21 and an actuating shoulder 22. Mating end 21 acts in conjunction with hook end 11 of the main body 10 to form a closed interior space 99. Mating end 21 should preferably match the configuration of the hook end 11 at the conjunction point and should abut hook end 11 such that no or only minimal space separates the two components.

Figure 3:
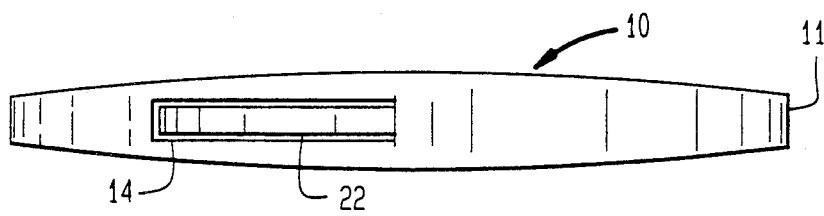
FIG. 3 is a bottom view of the invention.

As seen in FIG. 3, the actuating shoulder 22 of keeper arm 20 extends out of main body 10 through a shoulder aperture 14. Shoulder aperture 14 is a slot which opens into the arm cavity 12 of main body 10.

Figure 5:
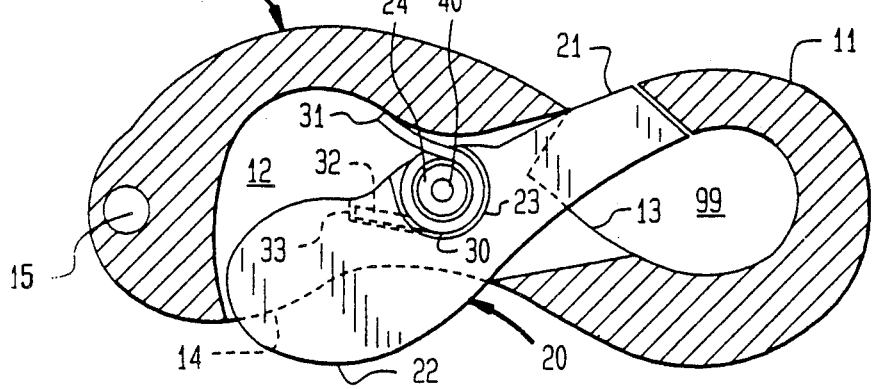
FIG. 5 is a cross-sectional view of the main body portion of the invention taken along line V—V of FIG. 1, showing the keeper arm and spring as exposed.

Referring now to FIG. 5, the main body 10 is shown in cross-section to expose the other components of the invention. Keeper arm 20 is positioned within arm cavity 12 of main body 10. Arm cavity 12 is an interior space of sufficient size to allow the keeper arm 20 a range of motion when pivoted around pivot pin 40. The mating end 21 extends through arm aperture 13 of main body 10 and the actuating shoulder 22 of keeper arm 20 extends out from shoulder aperture 14 of main body 10. Pivot pin 40 extends transversely through arm cavity 12. Pivot pin 40 can be attached to the interior wall of main body 10 or can be inserted through apertures cut into the sides of main body 10, the pivot pin 40 being soldered to secure it to the main body 10. Pivot pin receiving means 24 of keeper arm 20, preferably a tubular aperture, allows keeper arm 20 to rotate on pivot pin 40 relative to main body 10. Pivot pin receiving means 24 is preferably positioned to one side of the longitudinal axis as shown. This positioning allows for a greater separation distance between the mating end 21 and the hook end 11 when the clasp is opened. The size of the arm aperture 13 and overall configuration of the arm cavity 12 controls the extent of movement for keeper arm 20.

Figure 4:
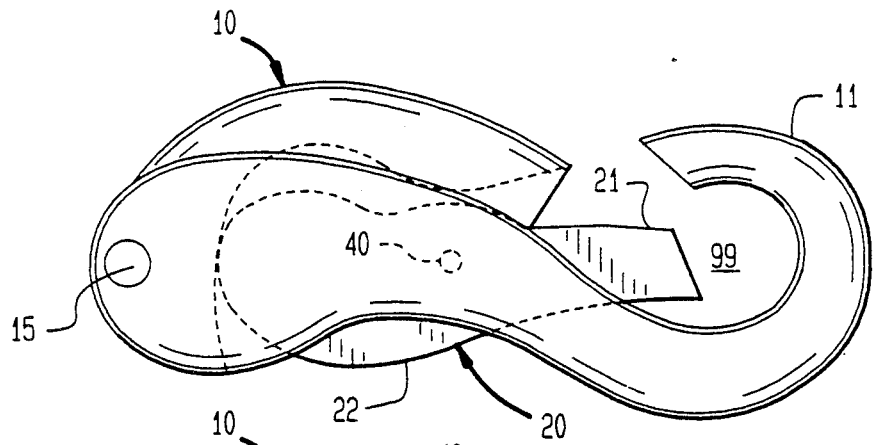
FIG. 4 is a side view of the invention in the open position.

Coiled spring 30 is seated in a spring cavity 23 on keeper arm 20 and surrounds the pivot pin 40 and pivot pin receiving means 24. Coiled spring 30 has an extended long arm 31 and an extended short arm 32. Short arm 32 rests in a slot 33 or abuts the side of keeper arm 20 while long arm 31 abuts against the side of arm cavity 12 in the main body 10. In this manner, the compression within the coiled spring 30 will maintain the keeper arm 20 in the closed position with the mating end 21 abutting the hook end 11 of the main body 10 and the actuating shoulder 22 extending the maximum distance from the shoulder aperture 14. Movement of the actuating shoulder 22 into the arm cavity 12 of the main body 10 will compress the spring 30, causing the mating end 21 to move into the interior space 99 of hook end 11, as shown in FIG. 4. Release of pressure against the spring 30 causes the mating end 21 to realign with the hook end 11, effectively closing off the interior space 99 and preventing any chain loop inserted over hook end 11 from coming free.

While the invention is shown with a particular design for its outer configuration, it should be apparent that other designs are possible which allow the mechanism to operate in the manner as described. The rounded configuration is preferred for ease of manipulation, but is not required. The actuating shoulder 22 and portions of the main body 10 could be scored to create a better gripping surface. Springs of different configuration and positioning can be used in place of coiled spring 30 to maintain the clasp in the closed position. For example, a folded leaf spring could be inserted into the arm cavity 12 to abut the inside of the actuating shoulder 22 of keeper arm 20 and the inside wall of arm cavity 12.

The full scope and definition of the invention therefore, is to be as set forth in the following claims.

We claim:

1. A clasp comprising a main body, a keeper arm and a spring, said main body having a hook end, an arm aperture, a shoulder aperture, and an arm cavity to receive said keeper arm and said spring, said keeper arm having an actuating shoulder and a mating end, said keeper arm being positioned within said arm cavity of said main body whereby said actuating shoulder extends from said arm cavity through said shoulder aperture, said actuating shoulder extending beyond said main body, and said mating end extends from said arm cavity through said arm aperture, said mating end abutting said hook end to create a closed interior space, said keeper arm being pivotally connected to said main body, said spring maintaining said mating end abutting said hook end, said arm cavity being of sufficient size whereby said actuating shoulder can be pivoted into said arm cavity to compress said spring and move said mating end into said interior space.

2. The device of claim 1, wherein said spring is a coiled spring and said keeper arm further comprises a spring cavity adapted to receive said spring.

3. The device of claim 1, where said keeper arm is pivotally connected to said main body by a pivot pin.

* * * * *